United States Patent [19]
Sweeney, Jr. et al.

[11] Patent Number: 6,164,343
[45] Date of Patent: Dec. 26, 2000

[54] METHOD AND APPARATUS FOR VERIFYING AN ENCAPSULATION OF QUICK-SETTING ADHESIVE IN SMALL RESERVIOR CUPS

[75] Inventors: Theodore J. Sweeney, Jr., Grosse Pointe Farms; Drew J. Smith, Bloomfield Hills, both of Mich.

[73] Assignee: Theodore Sweeney & Company, Inc., Clinton Township, Mich.

[21] Appl. No.: 09/490,821

[22] Filed: Jan. 25, 2000

Related U.S. Application Data

[63] Continuation-in-part of application No. 09/123,674, Jul. 28, 1998, Pat. No. 6,076,565.

[51] Int. Cl.⁷ ................. B65B 1/04; B65B 3/04
[52] U.S. Cl. ............ 141/1; 141/2; 141/4; 141/5; 141/7; 141/8; 141/39; 141/59; 141/64; 141/67; 141/94; 141/129; 53/89; 53/403; 53/493
[58] Field of Search .................. 141/1, 2, 4, 5, 141/7, 8, 39, 59, 61, 64, 67, 94, 100, 104, 129; 222/386, 389; 53/403, 493, 79, 89

[56] References Cited

U.S. PATENT DOCUMENTS 5,584,630 12/1996 Sweeney et al.
B1 5,044,852 4/1995 Sweeney et al..

*Primary Examiner*—Steven O. Douglas
*Assistant Examiner*—Timothy L. Maust
*Attorney, Agent, or Firm*—Brooks & Kushman P.C.

[57] ABSTRACT

A method of verifying an encapsulation of quick-setting adhesive in a small hermetically sealed reservoir cup from which the adhesive is dispensed on depression of a reservoir piston sealing the mouth of the reservoir cup. The method includes feeding a group of small reservoir cups to a filling station, determining an alignment of the group of small reservoir cups within the filling station, and flooding the interior of each cup at the station with cure preventing gas, if the group of small reservoir cups is determined to be aligned. The method further includes depositing a predetermined amount of quick-setting adhesive into each of the reservoir cups, immediately after flooding, and inserting a piston into each of the reservoir cups on top of the adhesive while flooding. The method involves the use of an apparatus for encapsulating the adhesive in the reservoir cups with the piston. The method ensures that the apparatus will properly encapsulate the quick-setting adhesive in each reservoir cup as designed.

11 Claims, 10 Drawing Sheets

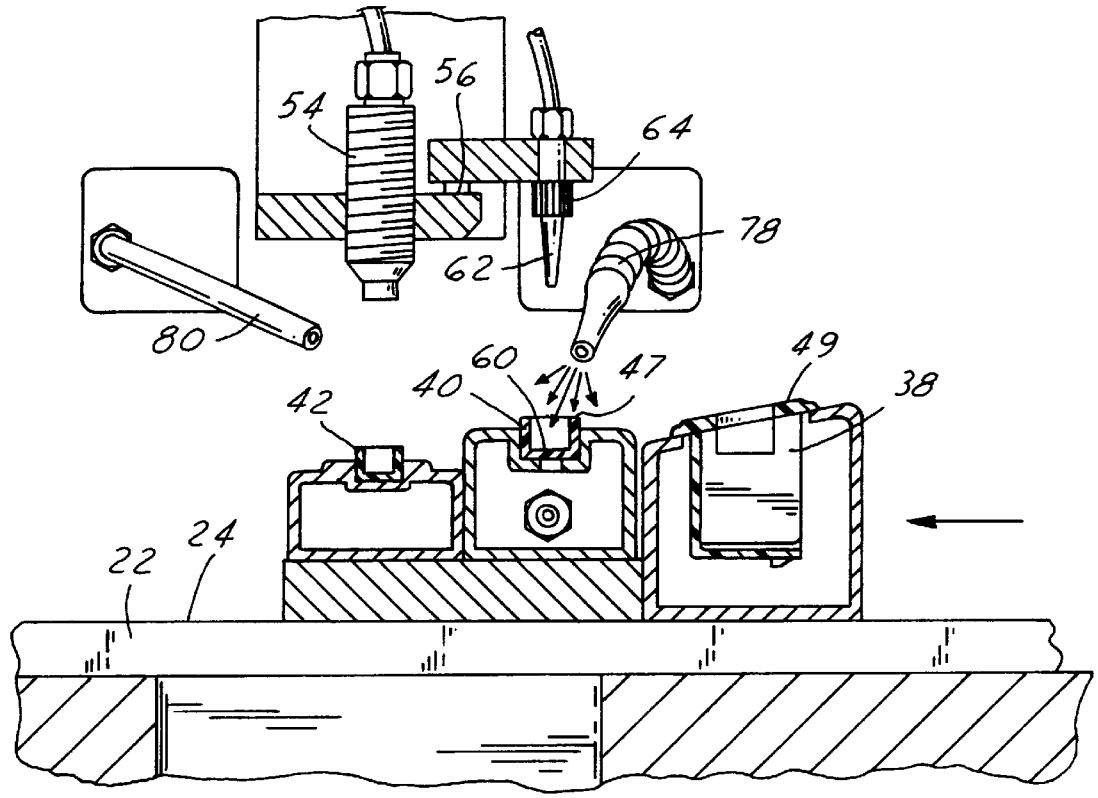
FIG.3
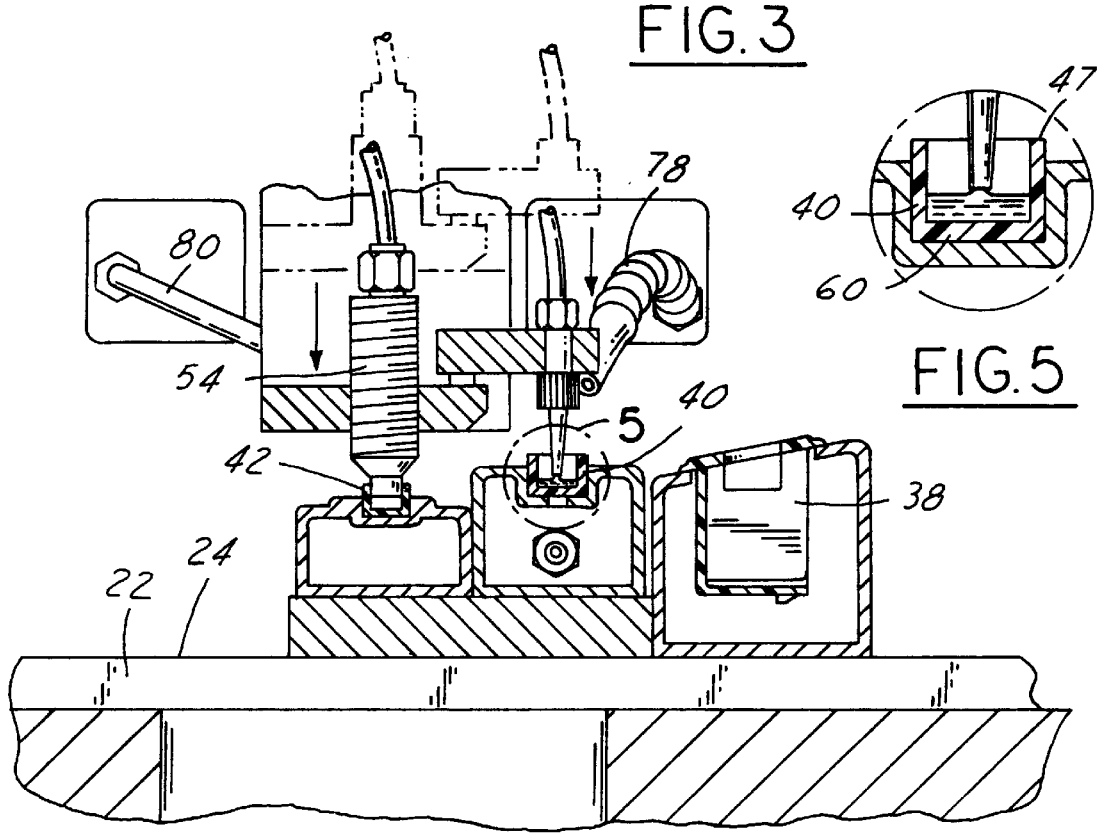
FIG.5
FIG.4

METHOD AND APPARATUS FOR VERIFYING AN ENCAPSULATION OF QUICK-SETTING ADHESIVE IN SMALL RESERVIOR CUPS

INCORPORATION BY REFERENCE

U.S. Pat. No. 5,277,530 and U.S. patent application Ser. No. 09/123,674, filed Jul. 28, 1998, are incorporated by reference.

CROSS REFERENCE

The present application is a CIP application of U.S. patent application Ser. No. 09/123,674, filed Jul. 28, 1998, now U.S. Pat. No. 6,076,565.

TECHNICAL FIELD

The present invention relates to an apparatus and methods of verifying certain operations during filling of self-dispensing adhesive fasteners.

BACKGROUND OF THE INVENTION

In U.S. Pat. Nos. B1 5,044,852, 5,584,630 and others, fasteners are disclosed which utilize quick-setting adhesives, such as anaerobic or cyanoacrylate adhesives. The fasteners are so designed that upon pressing them against a substrate to which the fasteners are to be attached, the adhesive is automatically dispensed into the interface between the fastener and the substrate and in but moments, the fastener is securely attached to the substrate.

The adhesive is contained in a reservoir cup in the fastener. The reservoir cup is made from a material which is intended neither to react with nor promote curing of the adhesive therewithin. The remainder of the fastener is intended to bond with the adhesive as the latter cures and may be formed of a rigid plastic. Examples of suitable plastics are found in U.S. Pat. No. 5,277,530.

As stated in Ser. No. 09/123,674 in some instances the adhesive had tended to cure in the reservoir notwithstanding the non-reactive character of the reservoir cup material, particularly if the loaded reservoir cup in a fastener was stored for a long interval. For example, an adhesive such as a cyanoacrylate, must have atmospheric water vapor excluded if premature curing is to be prevented. On the other hand, if an anaerobic adhesive is used, oxygen must be present to prevent premature curing. Accordingly, studies of these problems have indicated that the water vapor in the ambient atmosphere is apparently captured in the reservoir cup at the time it is filled with the adhesive and/or the piston is inserted in the reservoir cup and such water vapor will cause premature curing of cyanoacrylate adhesives. It becomes important to include oxygen in the reservoir cup of fasteners utilizing anaerobic adhesives.

After a reservoir cup is filled with the proper amount of adhesive, a piston is inserted in the open end to seal the interior. As stated in Ser. No. 09/123,674, a hydraulic lock may occur preventing insertion of the piston into the reservoir cup which prevents the piston from properly seating in the cup. Such lock can also prevent further displacement of the piston into the cup or create a buildup of excessive pressure within the reservoir leading to a squirting out of the adhesive as the fastener is applied to a substrate to which it is to be attached.

As stated in Ser. No. 09/123,674, modifications of both the reservoir and the fastener were desirable as well as the methods of charging the reservoir cup with adhesive and inserting the piston therein. Such modified methods of charging the reservoir cup with adhesive and inserting the piston therein may be further improved. As methods are automated and production levels increase, the need to automate verification of the methods also increases. The reason is simply that manual verification methods are increasingly laborious as production levels increase. More specifically, as production levels increase, the number of verifications needed also increases. In the situation where the human eye is used to verify that the methods are performed correctly, more workers are required as production levels increase. In turn, such methods become increasingly costly.

It has been found desirable to modify the current methods of charging the reservoir cup with adhesive and inserting the piston therein in order to include an automated way of verifying the various steps of the methods and providing a cost saving system.

BRIEF SUMMARY OF THE INVENTION

An object of the invention is an improved method of encapsulating quick-setting adhesive in a small hermetically sealed reservoir which verifies such encapsulation and efficient operations.

It is another object of the invention to provide a method of encapsulating quick-setting adhesive in a small hermetically sealed reservoir cup in a cost-saving system.

A more specific object of this invention is a method of verifying an encapsulation of quick-setting adhesive in a small hermetically sealed reservoir cup from which the adhesive is dispensed upon depression of a reservoir piston sealing the mouth of the reservoir cup. The method includes feeding a group of small reservoir cups to a filling station, determining an alignment of the group of small reservoir cups within the filling station, and flooding the interior of each cup at the filling station with cure preventing gas in sufficient quantity to displace the ambient atmosphere therefrom, if the group of small reservoir cups is determined to be aligned. The method further includes depositing a predetermined amount of the quick-setting adhesive into each of the reservoir cups, and while flooding the same with the gas, inserting a piston into each of the reservoir cups on top of the adhesive.

Another specific object of the invention is to provide a method of verifying an encapsulation of quick-setting adhesive in small reservoir cups from which the adhesive is dispensed. The method includes feeding a group of small reservoir cups to a filling station free of an adhesive curing agent, determining an alignment of the group of small reservoir cups within the filling station, and depositing a predetermined amount of the adhesive in the successive reservoir cups in the station, if the group of small reservoir cups is determined to be aligned. The method further includes flooding the free surface of the adhesive with an inert gas to displace an adhesive curing gas or vapor therefrom, and inserting a piston into the reservoir cup on top of the adhesive.

Yet another specific object of this invention includes a method of ensuring an encapsulation of quick-setting adhesive responsive to atmospheric moisture in small reservoir cups from which the adhesive is to be dispensed. The method includes presenting each reservoir cup at a filling station in a position to receive the adhesive, determining an alignment of each reservoir cup within the filling station, and displacing moisture from the interior of the reservoir cup in the station. The method further includes depositing a predetermined amount of adhesive into the reservoir cup while the reservoir cup is free of moisture, if each reservoir cup is determined to be aligned, and while displacing moisture from the interior of the reservoir cup, inserting a piston into the reservoir above the free surface, whereby the adhesive is sealed from atmospheric moisture.

Yet another specific object of this invention includes an apparatus for filling the reservoir cup of self-dispensing fasteners. The apparatus comprises, in combination, a fixture for holding the cup with its mouth opening upwardly, a nozzle for dispensing adhesive into the upwardly opening mouth of the cup, and a sensor for determining the presence of the cup in said fixture and preventing dispensing of the adhesive if the cup is not in the fixture.

BRIEF DESCRIPTION OF DRAWINGS

FIG. 3 is a partial side view of the apparatus of FIG. 1 shown at a first detent position;

FIG. 4 is a partial side view of the apparatus with an upper platen in a downward position at the first detent;

FIG. 5 is an enlarged view of an encircled area of FIG. 4;

BEST MODE FOR CARRYING OUT THE INVENTION

Generally, the present invention involves an apparatus and a method of verifying an encapsulation of quick-setting adhesive in a group of reservoir cups in order to assemble a self-dispensing fastener. Preferably and as shown in the figures (not to scale), the apparatus facilitates the method which comprises feeding the group of reservoir cups to a filling station, determining an alignment of the group of reservoir cups within the filling station, and flooding the interior of each cup at the station with cure preventing gas to displace the ambient atmosphere therefrom, if the group of reservoir cups is determined to be aligned. The apparatus also deposits a predetermined amount of the adhesive into each of the reservoir cups and inserts a piston into each of the reservoir cups on top of the adhesive, defining a piston-adhesive-reservoir cup (PAR) assembly. Furthermore, the PAR assembly is then placed in a bracket or other device which is to be attached to a desired article by pressing the piston farther into the reservoir cup. The dispensed adhesive fastens the bracket or part onto a desired article.

Figure 1:
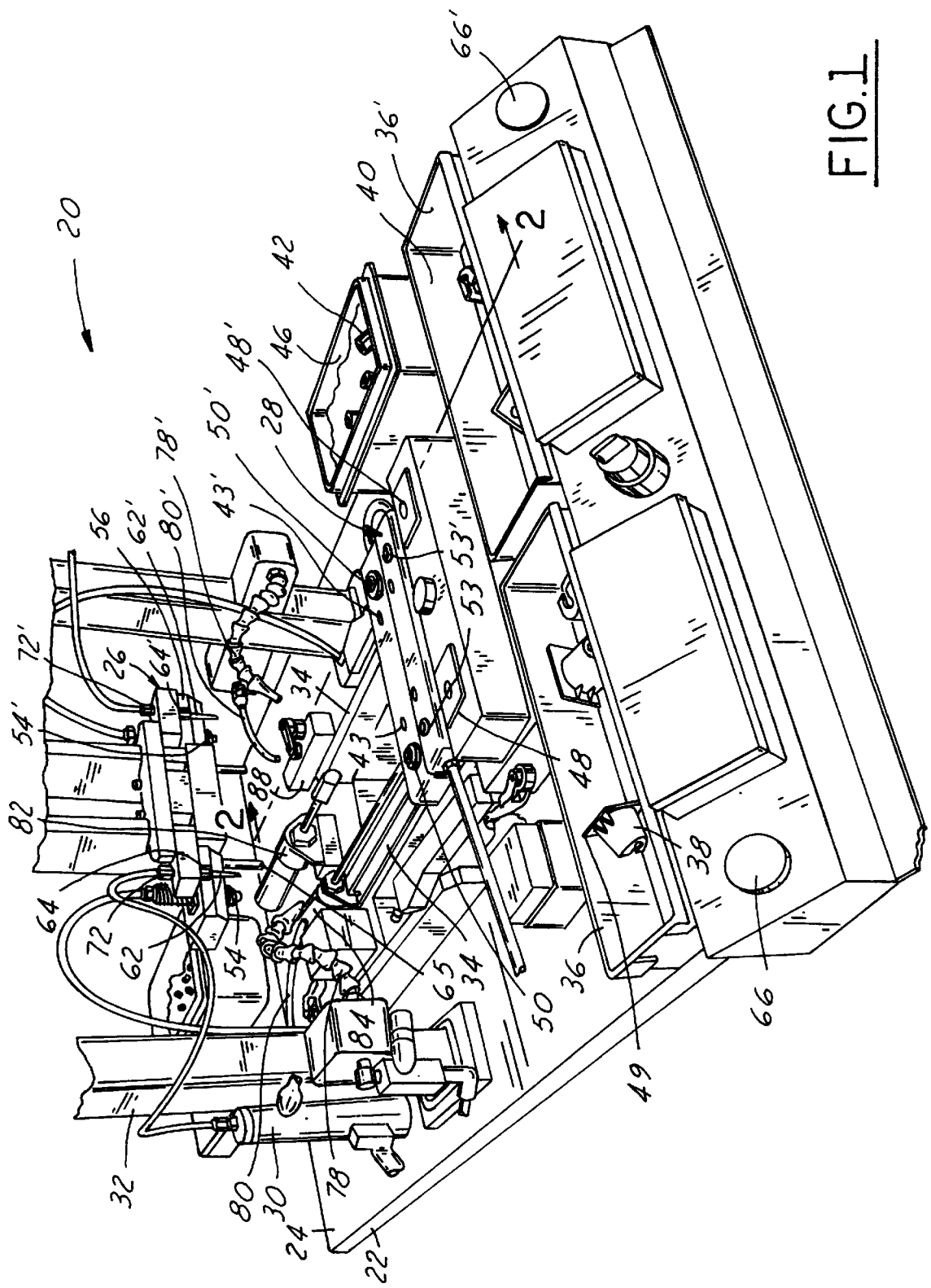
FIG. 1 is a perspective view of an apparatus used in accordance with the present invention.

As shown in FIG. 1, apparatus 20 comprises a stand or table 22. Upper surface 24 of table 22 supports filling mechanism 26 including a slider or fixture 28. Adhesive is contained within pressurized container 30 carried by vertical member 32 mounted on table 22. Such container may be part of an associated apparatus manufactured by Loctite Corporation of Rocky Hill, Conn., U.S.A., and sold under the trademark ZETA and are conventional. A source of dry nitrogen or other gas is provided by any suitable means. Such gas may be delivered by any suitable means to container 30 in order to pressurize the adhesive therein so it may be delivered through lines to the fill nozzle 78 as hereafter described.

Figure 2:
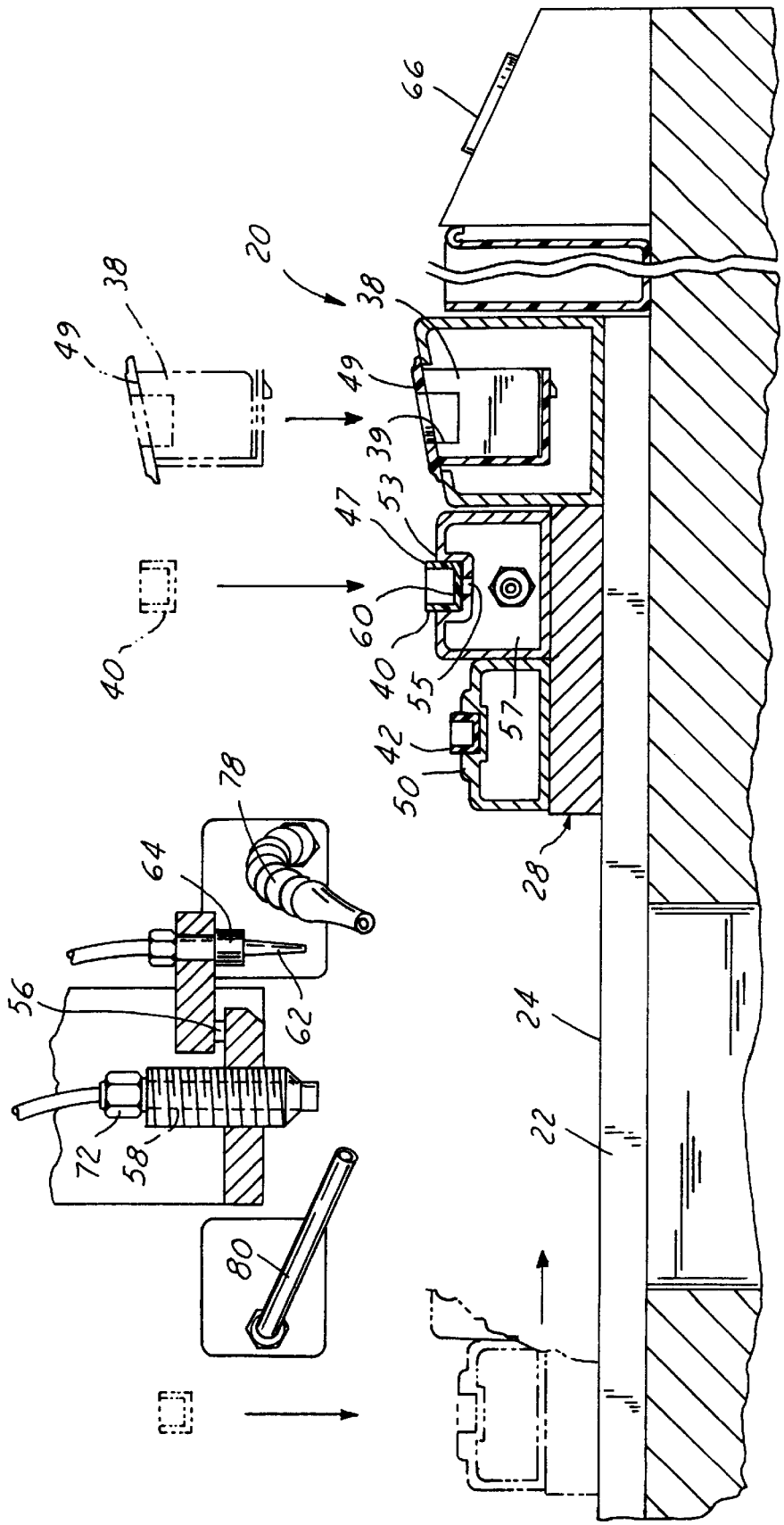
FIG. 2 is a partial side view of the apparatus of FIG. 1 shown at an initial detent position.

Generally, slider 28 is mounted on table 22 for movement along guide rail 34 from an initial or a loading position shown in FIGS. 1 and 2 to a first detent or a filling position shown in FIGS. 3 and 4. Then, slider 28 slides to a second detent or piston inserting position shown in FIG. 6. Slider 28 then slides to a third detent or bracket inserting position shown in FIGS. 9 and 10. Slider 28 then slides back to the initial position, completing one filling cycle.

On table 22 are conveniently located containers 36 and 36' respectively for holding a supply of fastener bodies or brackets 38 and reservoir cups 40. Table 22 also has container 46 thereon for holding a supply of pistons 42. Slider 28 moves reciprocally on table 22 straddling track 34.

The slider 28 is adapted to receive and support groups of brackets 38, reservoir cups 40, and pistons 42. In the embodiment shown, two brackets are supported on the slide, though the mechanism can be designed to handle a larger group. The brackets are supported on the slider 28 in sockets 48 and 48' which receive them in a slip-fit arrangement and hold them in proper orientation. The brackets have a lip 49 which overlies the margin of the socket as shown in FIG. 2.

The slider is also adapted to receive and support in proper orientation a group of reservoir cups 38, in this case two, though the slider could be designed to hold a larger group. The reservoir cups are supported on the slide in a slip fit in sockets 53 and 53', which have an opening 55 in the bottom so that each socket is exposed to either a vacuum or a gas pressure in the socket manifold or vacuum pressure line 57.

Finally, the slider is adapted to receive and support in proper orientation a group of reservoir pistons 42, in this case two, though the slider could be adapted to hold a larger group. FIG. 2 shows one of the pistons 42 supported in what may be termed a stanchion, two such being shown at 50 and 50', one for each piston.

In this embodiment, with the slider 28 in the initial position shown in FIGS. 1 and 2, an operator of apparatus 20 takes a group of brackets 38, cups 40, and pistons 42 and places the groups in their respective locations in slider 28. However, this embodiment may be modified to automatically place brackets 38, cups 40 and pistons 42 in their respective locations in slider 28 by any suitable means, such as by bowl-feeding. It is to be noted that such embodiment does not fall beyond the scope or spirit of this invention.

Supported for vertical movement above the track 34 is an upper platen 56. Such platen is supported similar to the platen 136 in application Ser. No. 09/123,674. Carried by the platen are various filling nozzles, 62 and 62', rams 54 and 54' and nozzles 78, 78', 80, and 80'. Each carries out certain functions.

The nozzles 78, 78', 80, and 80' serve to deliver a gas to the reservoir cups and pistons. Such gas displace ambient atmosphere from the pistons and reservoir cups during filling of the cups with adhesive and inserting the pistons therein. The rams 54 and 54' transfer pistons 42 from the stanchions 50 and 50' and inserts them into the upwardly opening mouths of the reservoir cups 40 after the adhesive has been deposited therein, defining piston-adhesive-reservoir cup (PAR) assemblies. Rams 54,54' finally insert the PAR assemblies into the brackets 38, defining fastener assemblies. The rams then remove the completed fastener assemblies out of sockets 48, 48'. The details of this operation are hereinafter explained.

It is to be noted that certain verifications are performed during operation of apparatus 20, i.e., during practice of the method for filling the reservoir and assembling the combination of parts. In particular, it is determined whether the reservoir cups 42 are present and aligned within the filling station or slider 28. For example, if there is no reservoir cup present when adhesive is to be deposited therein, or though present is not properly oriented, further operations may be either prevented or an alarm sounded, warning the operator of a defect so that the machine is not contaminated with adhesive requiring a costly clean-up thereof.

In the filling or first detent position and as shown in FIGS. 3 and 4, a pair of adhesive filling nozzles or spouts 62 and 62' are mounted at the lower ends of adhesive injectors or valves 64, 64' with actuators (not shown) mounted on upper platen 56. These valves and actuators are commercially available from Loctite Corporation under the trademark ZETA. Their function is to deposit a metered or predetermined amount of adhesive through nozzles 62 and 62' into reservoir cups 40 as depicted in FIG. 5.

The amount of adhesive deposited into each reservoir cup 40 will depend upon the amount of adhesive to be dispensed by the fastener as it is secured to its substrate, but a typical small fastener may receive approximately 0.25 grams into reservoir cup 40. Upon depressing simultaneously buttons 66 and 66', the upper platen may be caused to descend to the positions shown in FIGS. 4 and 6. Nozzles or spouts 62, 62' have their lower ends received within the mouth of the reservoir cups when the upper platen descends.

It has been found desirable to sense the failure to deposit the metered amount of adhesive into the reservoir cups. Sensors (not shown) may be provided in pneumatic lines (discussed below) to determine whether valves 64, 64' have been actuated. If not, then slider 28 and upper platen 56 will be interrupted and a signal may turn on.

A suitable fluid pressure actuator (not shown) is connected to the upper platen to vertically shift it. Cams (not shown) may actuate controls for causing dispensing of the adhesive by the injectors when the platen is in the lower position.

At the same time that nozzles 62, 62' are depositing adhesive in the reservoir cups 40, rams 54, 54' on the upper platen 56 is received within pistons 42 carried by stanchions 50, 50'. A vacuum is imposed on fittings 72, 72' which lifts the pistons with rams 54, 54' so that upon upper platen 56 rising, the pistons will be withdrawn from stanchions 50, 50' and lifted above the slider or fixture to a position awaiting further movement of slider 28.

Figure 6:
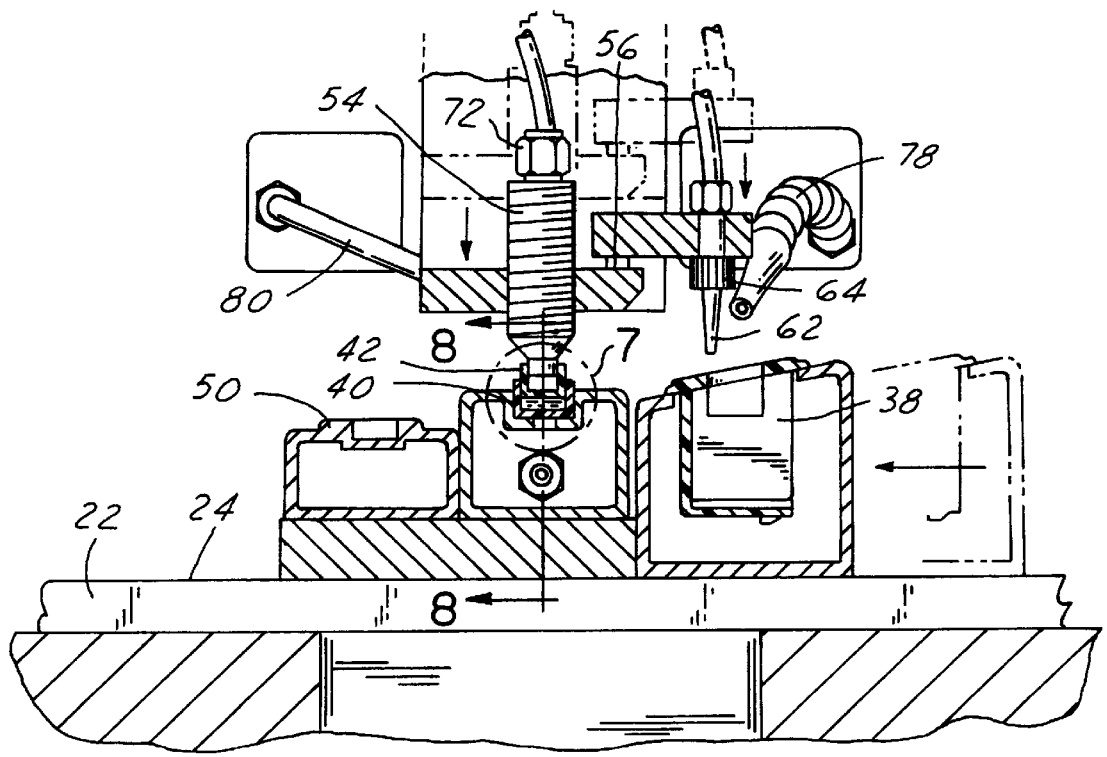
FIG. 6 is another partial side view of the apparatus of FIG. 1 at a second detent position.

Upon deposit of the metered amount of adhesive in the reservoir cups, the platen rises and the slider 28 moves to the second detent or the piston inserting position shown in FIG. 6. It will be noted that at the front of apparatus 20 as shown in FIG. 1, buttons 66 and 66' are so arranged that both may be simultaneously pressed by the operator of the apparatus to enable the platen to descend to the filling position. In the second detent position, because of the necessity of the very accurate alignment of the pistons 42 with the reservoir cups into which the pistons are to be inserted, alignment pins 66 and 66' are provided on the upper platen as shown in FIG. 1 which are received in alignment pin-receiving sockets 43 and 43' in the slider. As best shown in FIG. 1, alignment pins 66 and 66' will ensure exact alignment of upper platen 56 onto slider 28, as upper platen 56 moves downwardly. Exact alignment is required because there is a press-fit between the piston and the reservoir cup. The piston is inserted so that its bottom 60 is disposed opposite lip 47 of the reservoir cup as more clearly shown in FIG. 7.

Figure 7:
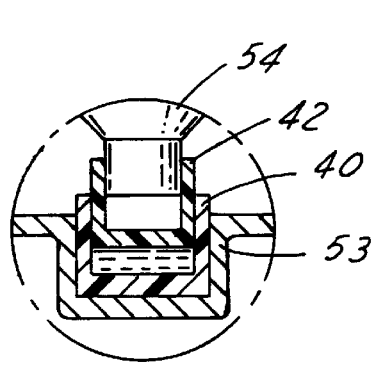
FIG. 7 is an enlarged view of an encircled area of FIG. 6.
Figure 8:
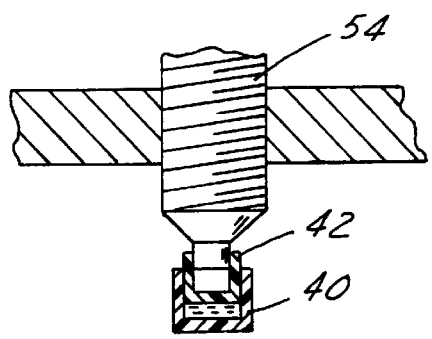
FIG. 8 is a sectional view of the apparatus taken along line 8—8 of FIG. 6 but with the upper platen raised.
Figure 8:
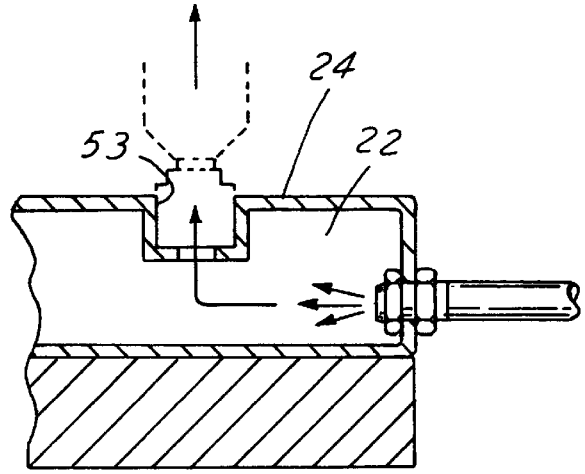

In FIGS. 6 and 7, piston 42 is shown as it is inserted within reservoir cup 40 on top of the adhesive, during the downward stroke of upper platen 56. Preferably, piston 42 is inserted while reservoir cups 40 are flooded with nitrogen gas. With piston 42 inserted into reservoir cup 40, the adhesive within reservoir cup 40 is sealed from the atmosphere so that curing will not occur until the adhesive is expelled from reservoir cup 40 into the interface between the resulting fastener assembly and the substrate to which it is to be secured.

Following insertion of piston 42 within reservoir cup 40, platen 56 rises and maintains the vacuum in passageway 58. Because of the press-fit of piston 42 within reservoir cup 40, each PAR assembly is lifted from its respective socket within slider 28. Slider 28 then moves along to the third detent position.

Figure 11:
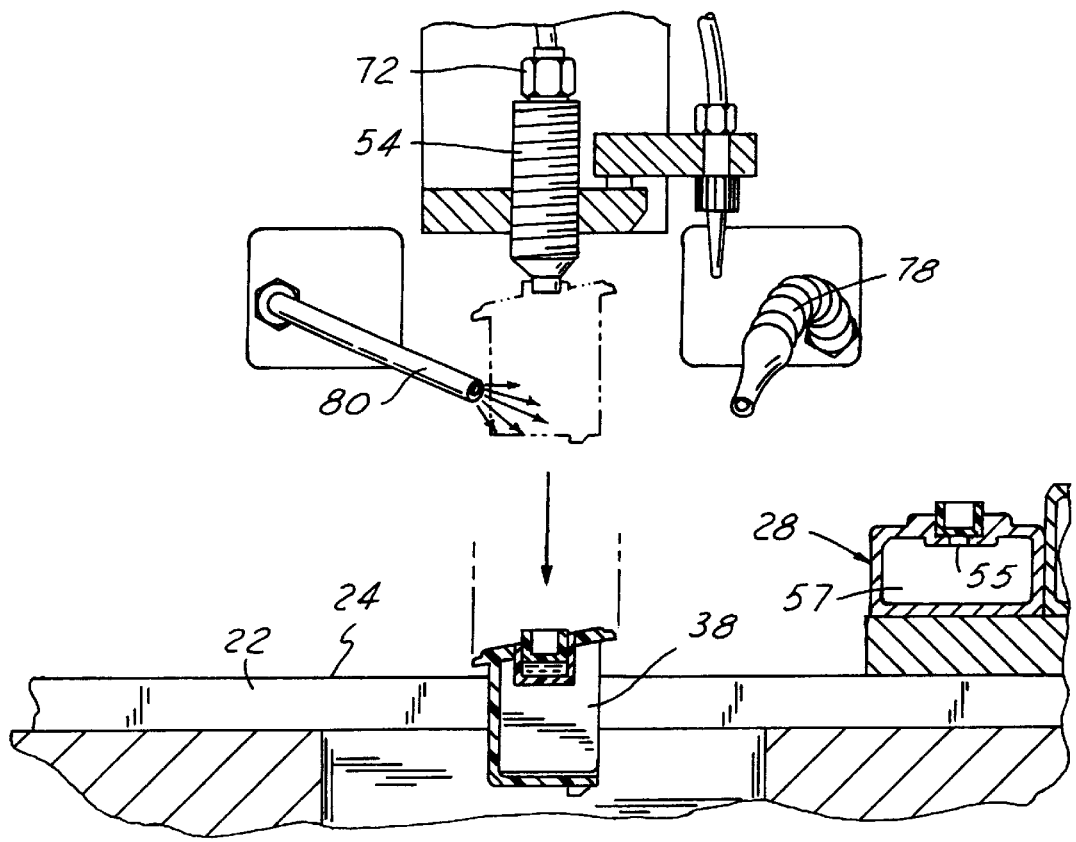
FIG. 11 is a partial side view of the apparatus releasing an assembled fastener.
Figure 12:
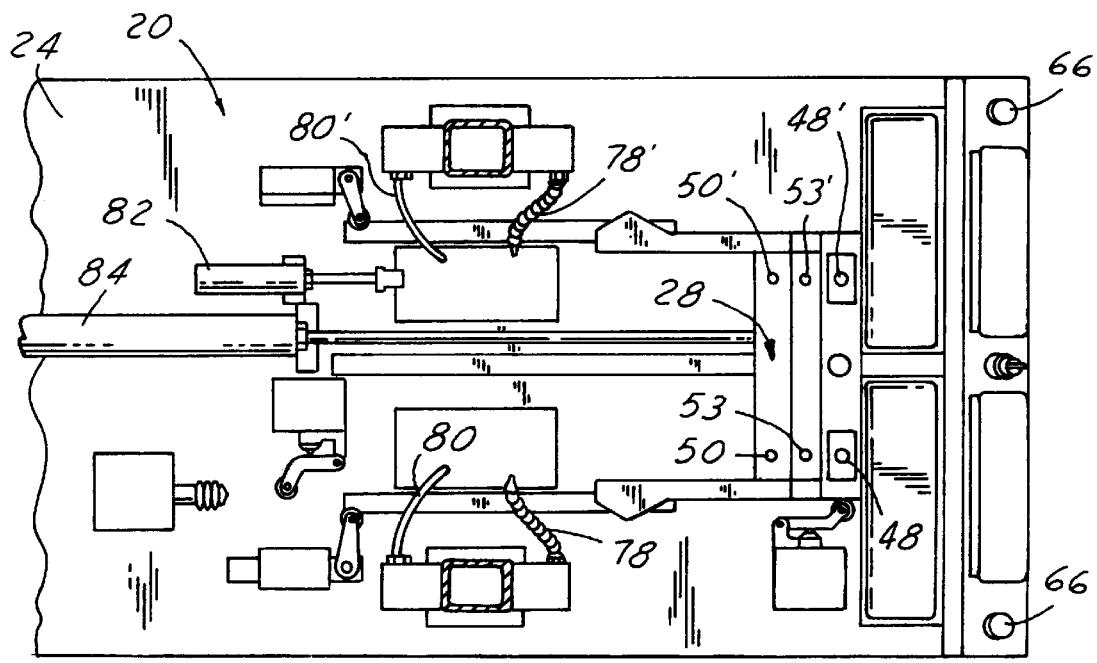
FIG. 12 is a partial top view of the apparatus of the present invention.

When slider 28 moves to the third detent position, upper platen 56 then moves downwardly to insert the PAR assembly into socket 39 of bracket 38. The PAR is received by socket 39 with a snug fit such that the assembled fastener may be slipped out of the respective slider socket 48 and lifted upwardly by the vacuum as upper platen 56 returns upwardly. The fastener assembly, as defined above, is lifted by ram 54 upwardly from slider 28 and slider 28 returns to the initial position. A cam-operated valve switch may cause temporary pressurization of fitting 72 to blow the fastener out of ram 54 downwardly into a container as shown in FIG. 11. Control valve switches may be provided as necessary, operated by suitable cams as desired or needed to aid the operator and operation of apparatus 20.

To ensure that the adhesive in the reservoir cup is not contaminated by ambient atmosphere whose water vapor content will be sufficient to initiate curing of the adhesive, we have provided for a bathing of the reservoir cups and pistons at the first and second detent positions by gaseous dry nitrogen as, for example, supplied by any suitable means such as a local cylinder (not shown) having pressurized dry nitrogen. For this purpose, a continuous stream of dry gaseous nitrogen is delivered to flood the reservoir cups both prior to and during filling thereof with the adhesive. Nitrogen gas is also delivered, during insertion of the pistons into the cups. Thus, it will be noted that the nitrogen gas delivery nozzles 78, 78' are positioned adjacent the adhesive fill nozzles 62, 62' to respectively direct a stream of gaseous nitrogen directly into the reservoir both before and during the filling operation. This leaves a blanket of nitrogen above the free surface of the adhesive in the reservoir cup.

As shown in FIGS. 1 and 2, additional nitrogen delivery nozzles 80 and 80' may be provided to bathe the reservoir cups in the second detent position with gaseous nitrogen. Thus, at the time the piston is inserted into the reservoir cup, nitrogen surrounds the reservoir cup and provides for nitrogen beneath the piston as it enters the reservoir cup. This ensures the presence of a small nitrogen bubble between the upper free surface of the adhesive and the inner wall of the reservoir.

We have found that it may be desirable to discontinue the stream of dry gaseous nitrogen during filling of the fastener reservoir cups with the adhesive. Therefore, nitrogen is introduced as a burst by nozzles 78 and 78' as the slider reaches the first detent position shown in FIG. 3, just prior to adhesive delivery. We have found that this provides for a better filling of the reservoir cups. By depositing the cups with adhesive immediately after the burst of dry gaseous nitrogen, atmospheric air is essentially excluded from the cups. Of course, the dry gaseous nitrogen continues to be delivered to the filled cups when at the second detent shown in FIG. 6. Such nitrogen delivery ensures the presence of the nitrogen bubble.

We have also found that the burst clears the reservoir cup free of debris which may have been present therein. Debris, including various particles such as dirt, dust, paper, sponge, etc., act to contaminate the adhesive in the PAR assembly by curing the adhesive therein. Also, the vacuum drawn on the manifold, upon which the reservoir cup is placed, prevents the cup from being forced out of the slider socket 53, as the burst is introduced. That is, the vacuum acts to hold the cup in socket 53 as the cup is cleared from debris by the burst.

As mentioned above, we have found it desirable to verify that each reservoir cup 40 is present within the respective slider socket and aligned therein when slider 28 is in its initial or loading position shown in FIG. 2. If a reservoir cup is not present in a slider socket, then the slider will not be shifted to the first detent position. This verification will prevent adhesive from being deposited into an empty slider socket, or into a reservoir cup mis-aligned in its receiving pocket. Otherwise, a slider socket not having a reservoir cup located therein would allow adhesive to be dispensed therein, requiring the apparatus to be shut down for cleaning out the adhesive.

This verification will also prevent an undesirable situation in which the reservoir cup is not substantially aligned within the slider socket, and the piston is subsequently inserted into the reservoir cup having adhesive therein, providing an undesirable PAR assembly. In the event the reservoir cup is not aligned, the upper platen and the slider will be interrupted.

To accomplish this verification, slider sockets 48, 48' may respectively include openings 55, 55' at each bottom which communicate with a manifold or vacuum/pressure line 57 in the slider. A vacuum is drawn on the manifold. Unless the vacuum reaches a predetermined valve as served by sensor VAC1 indicating that the reservoir cups are present and in proper orientation, the control circuit of FIG. 15 will prevent movement of the slider until the problem is fixed.

We have also found that it is desirable to ensure that when slider 28 is moved to the second detent position and prior to lowering the upper platen to carry piston 42 into the reservoir cup, if a piston is in fact not present on rams 54, 54', the platen will not lower. This will prevent vacuum within rams 54, 54', which are intended to hold pistons in place, from sucking the adhesive out of the cup and seriously contaminating the ram and associated pneumatic lines, and will also insure that a piston is placed in each reservoir cup. Therefore, in the vacuum delivery line, there is a sensor VAC2 (see FIG. 15) which will sense the vacuum in the line. Should the vacuum be less than a predetermined value, the sensor will trigger an interruption in the circuitry for safety buttons 66 and 66' so that the upper platen will not descend.

Similarly, a sensor may be provided in pneumatic lines 71 leading to fittings 72, 72' for rams 54, 54' which will sense whether the completed fastener assemblies have been removed from the slider before it returns to its initial loading position. If there is a fastener assembly in either ram 54 or 54', the pressure in the lines will be much greater and this will trigger a circuit preventing the upper platen from lowering so that damage to the apparatus will be avoided. The sensing mechanism is available from Numatics Corporation above mentioned.

In the event a different type of adhesive is being charged into the reservoirs, such as an anaerobic, instead of nitrogen gas, oxygen may be supplied through nozzles 78, 78', 80 and 80'.

Figure 13:
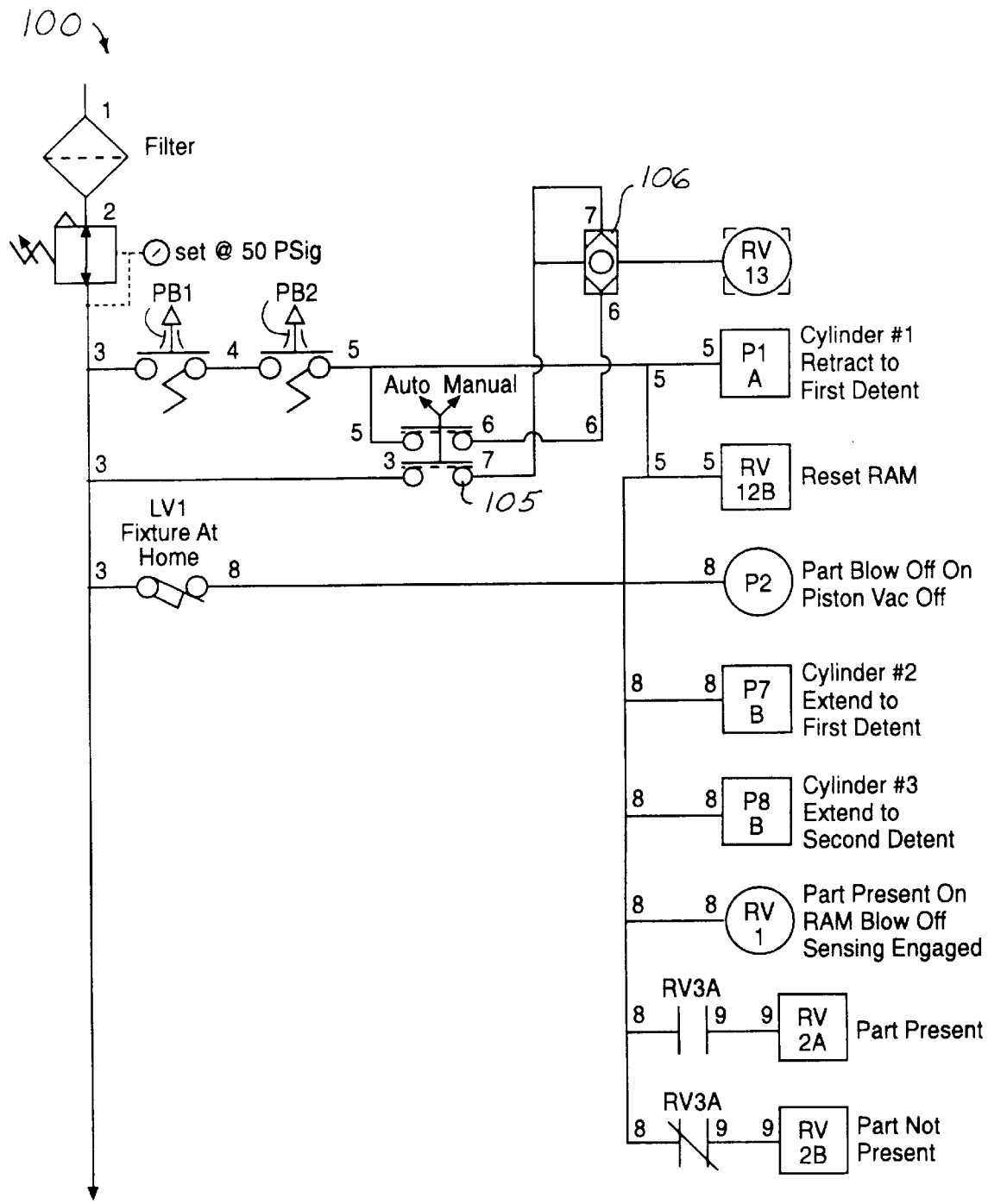
FIG. 13 is a portion of a schematic flow chart of control mechanisms of the apparatus.
Figure 14:
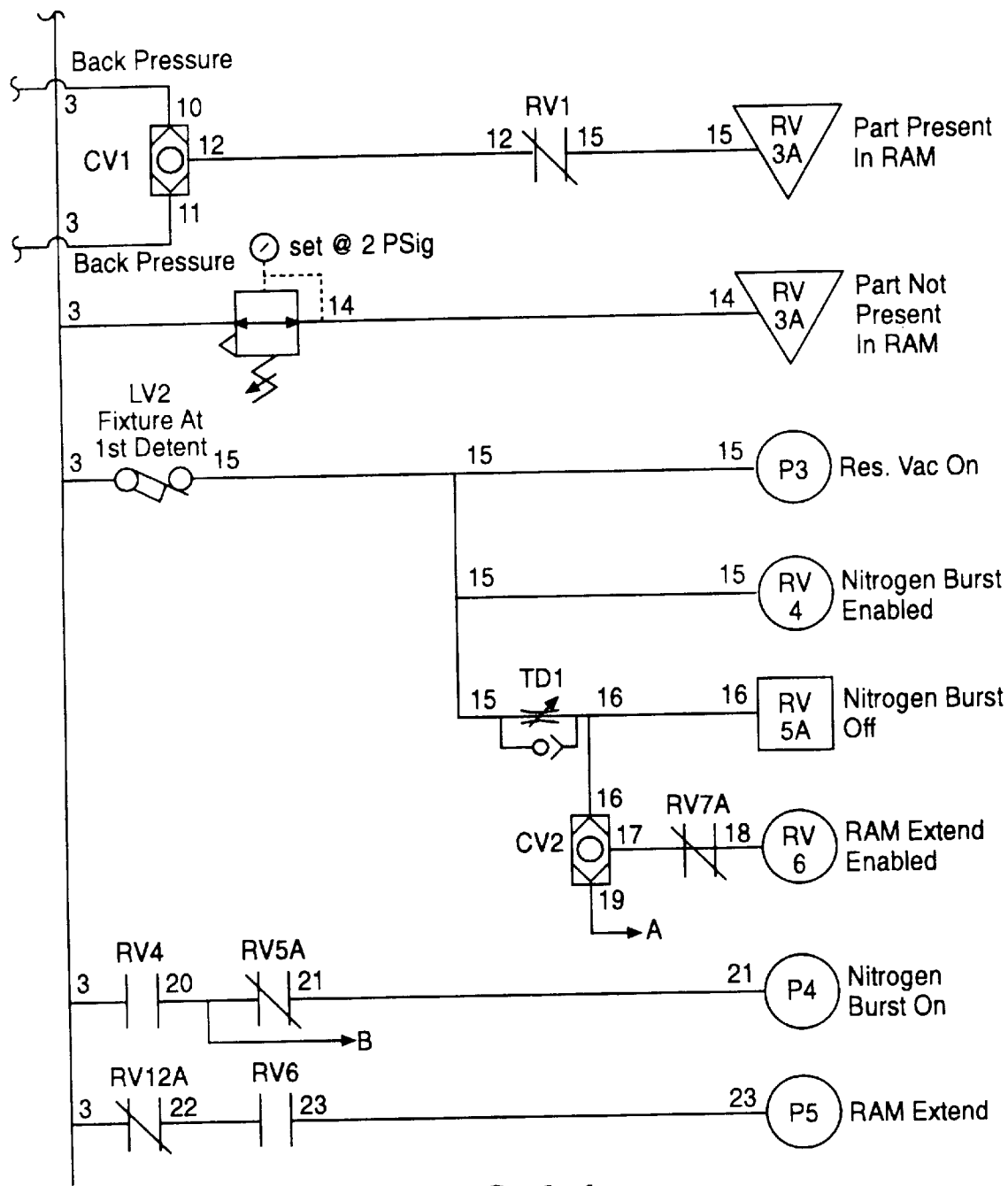
FIG. 14 is another portion of the flow chart of control mechanisms of the apparatus.
Figure 15:
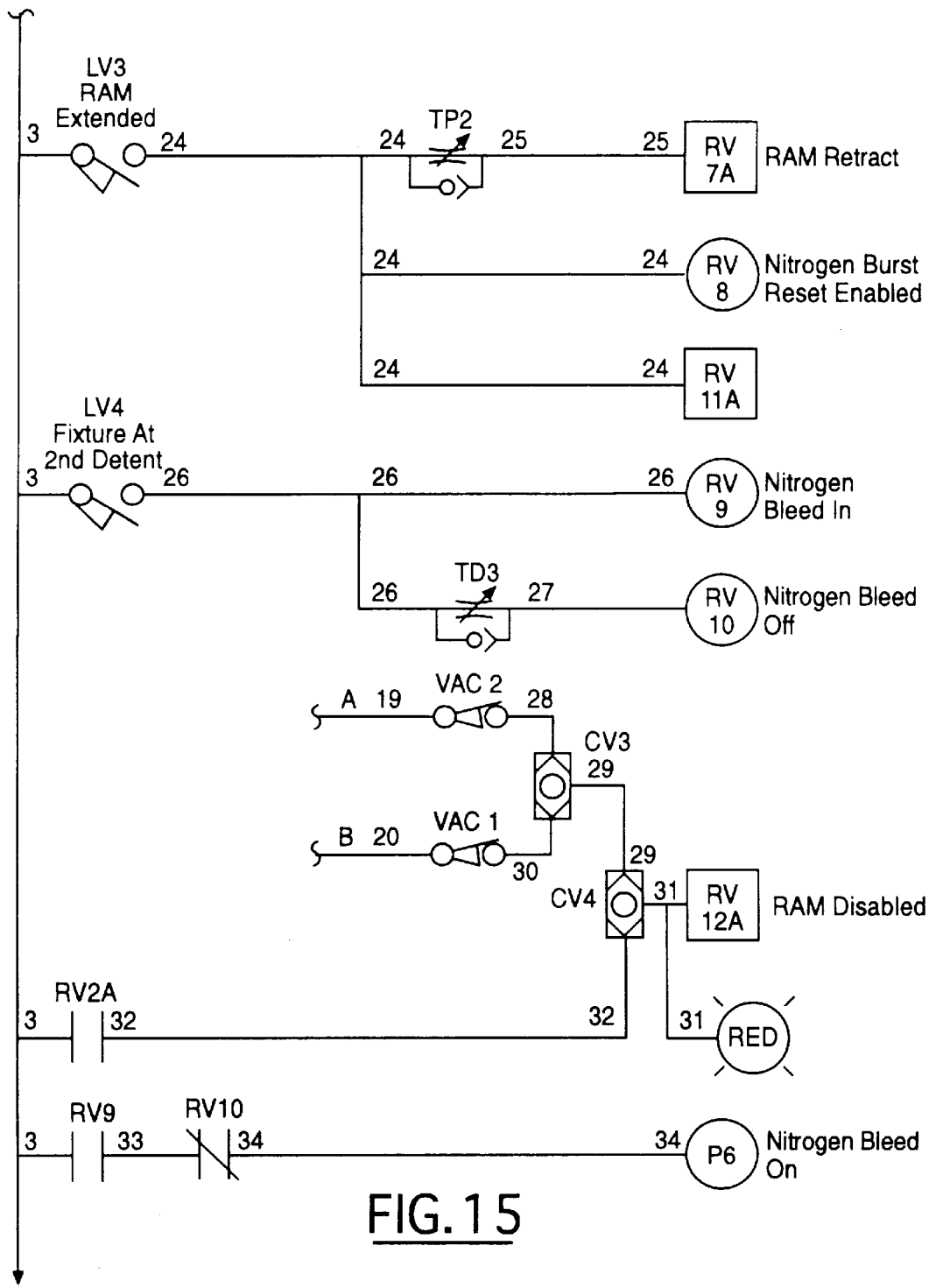
FIG. 15 is yet another flow chart of control mechanisms of the apparatus.
Figure 16:
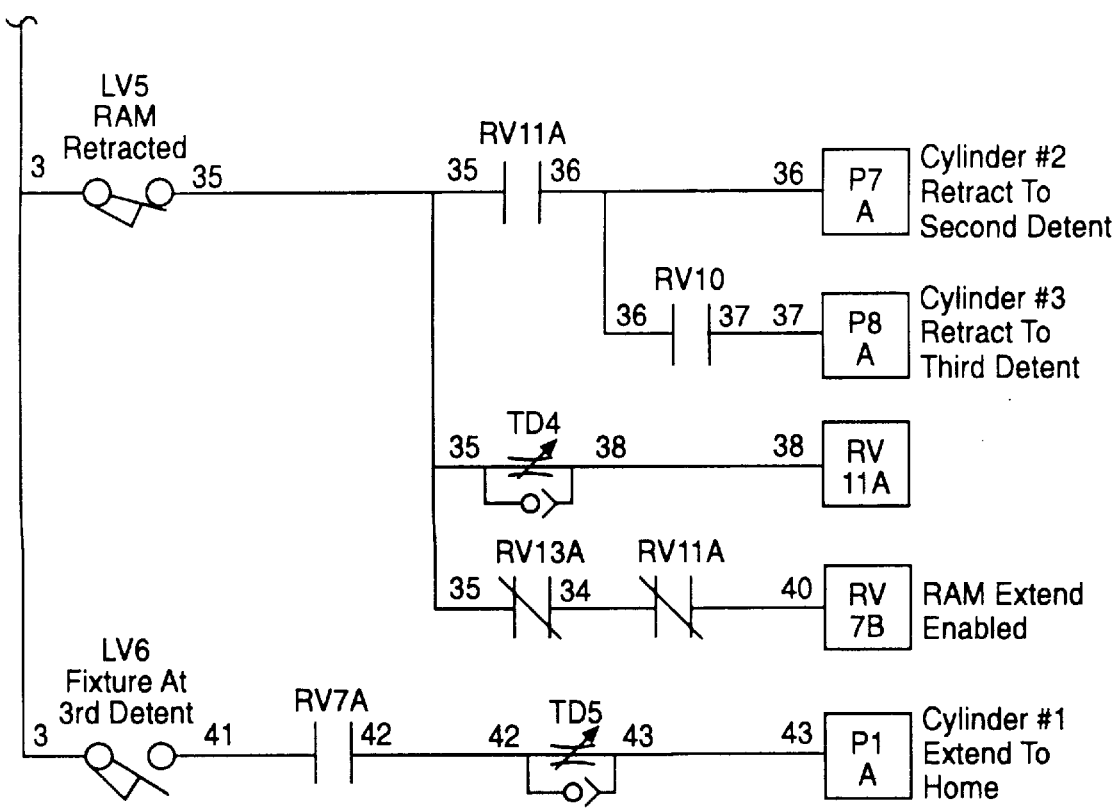
FIG. 16 is yet another portion of the flow chart of the apparatus.

FIGS. 13–16 depict a pneumatic flow sheet of flow which control mechanisms of apparatus 100 in FIGS. 1–12. In this embodiment, a main air supply (not shown) and an air regulator (not shown) are on. Pressure for the controlled air is preferably set to 50 psig as shown. As referred in FIGS. 1 and 2, slider 28 is at its initial position and is empty, and rams 54, 54' are retracted and empty. Nitrogen supply (not shown) is on and nitrogen burst valves (not shown) are off. Automatic/manual switch 105 is set to automatic. As shown in FIGS. 1, 13, and 16, limit valves LV1 and LV5 are actuated.

At the start of the fastener assembly operation for apparatus 20 of FIGS. 1–12, an operator manually loads pistons 42, bracket 38 and reservoir cups 40 into slider 28. The operator then presses buttons 66, 66' shown in FIG. 1, which are buttons PB1 and PB2 in FIG. 13. Thereafter, cylinder 84 retracts to move slider 28 to the first detent position. As shown in FIGS. 1 and 13, limit valve LV1 is then released. As LV1 is released, part blow off valve P2 turns off, part present sensor VAC2 for sensing pistons 40 in rams 54, 54' is deactivated, and vacuum on ram 54 is activated.

Slider 28 then moves to the first detent as shown in FIGS. 3 and 4, and actuates limit valve LV2 in FIG. 14. Through openings 55, 55' of sockets 48, 48', vacuum on reservoir cups 40 is then activated and holds reservoir cups 40 in sockets 48, 48'. Nitrogen as described above is then blown into reservoir cups 40. As shown in FIG. 14, timer TD1 is initiated. Part present sensor VAC1 to sense cups 40 in sockets 48, 48' is activated. Timer TD1 then stops, and nitrogen burst is deactivated. Rams 54, 54' begin to extend to release limit valve LV5 in FIG. 16.

Rams 54, 54' then fully extend, actuating limit valve LV3, as seen in FIG. 15. Timer TD2 is initiated. Pistons 42 are lifted into rams 54, 54', aided the vacuum. Adhesive is dispensed into reservoir cups 40. As shown in FIG. 16, relay valve RV11A is shifted, disabling rams 54, 54' from extending. Then, timer TD2 is initiated in FIG. 15, and rams 54, 54' retract to actuate limit valve LV5. As shown in FIGS. 1 and 16, once limit valve LV5 is actuated, cylinder 84 retracts to the second detent to release limit valve LV2 and actuate limit valve LV4. Timer TD4 then is initiated. Limit valve LV2 is then released and the vacuum to reservoir cups 40 is stopped. Part present sensor VAC1 on reservoir is disabled, as shown in FIG. 15. Moreover, limit valve LV4 is actuated and timer TD3 is initiated. Part present in ram sensor VAC2 is activated, and nitrogen bleed is turned on.

As shown in FIG. 16, timer TD4 then stops and ram 54 begins to extend, releasing limit valve LV5. Once ram is fully extended, piston 42 is inserted into reservoir cup 40, as shown in FIG. 6. Limit valve LV3 is then actuated. Once limit valve LV3 is actuated, timer TD2 is initiated. Then, relay valve RV11 is shifted to disable ram 54 from extending.

Timer TD3 then stops and the nitrogen bleed is turned off. Cylinder 84 then extends to the third detent. Then, timer TD2 stops and ram 54 retracts to release limit valve LV3 and actuate limit valve LV5. The piston 42-reservoir cup 40 assembly is then picked up by ram 54, and limit valve LV3 is released.

Figure 9:
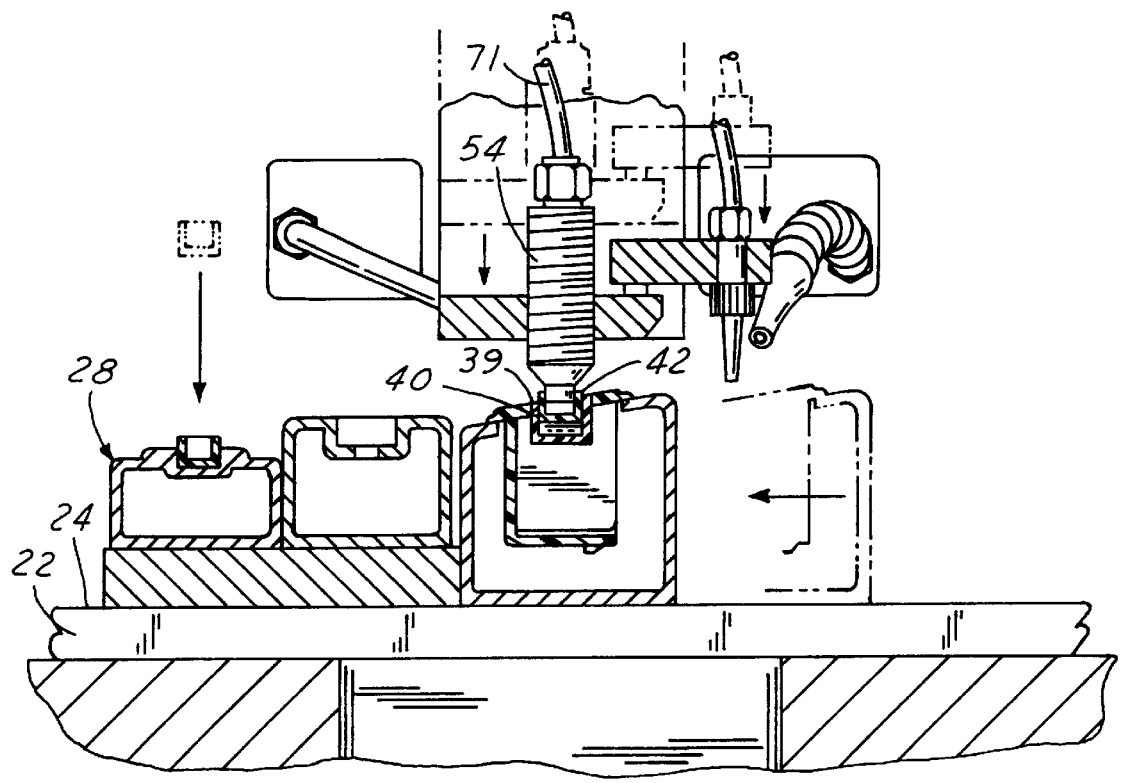
FIG. 9 is yet another partial side view of the apparatus shown at a third detent position.
Figure 10:
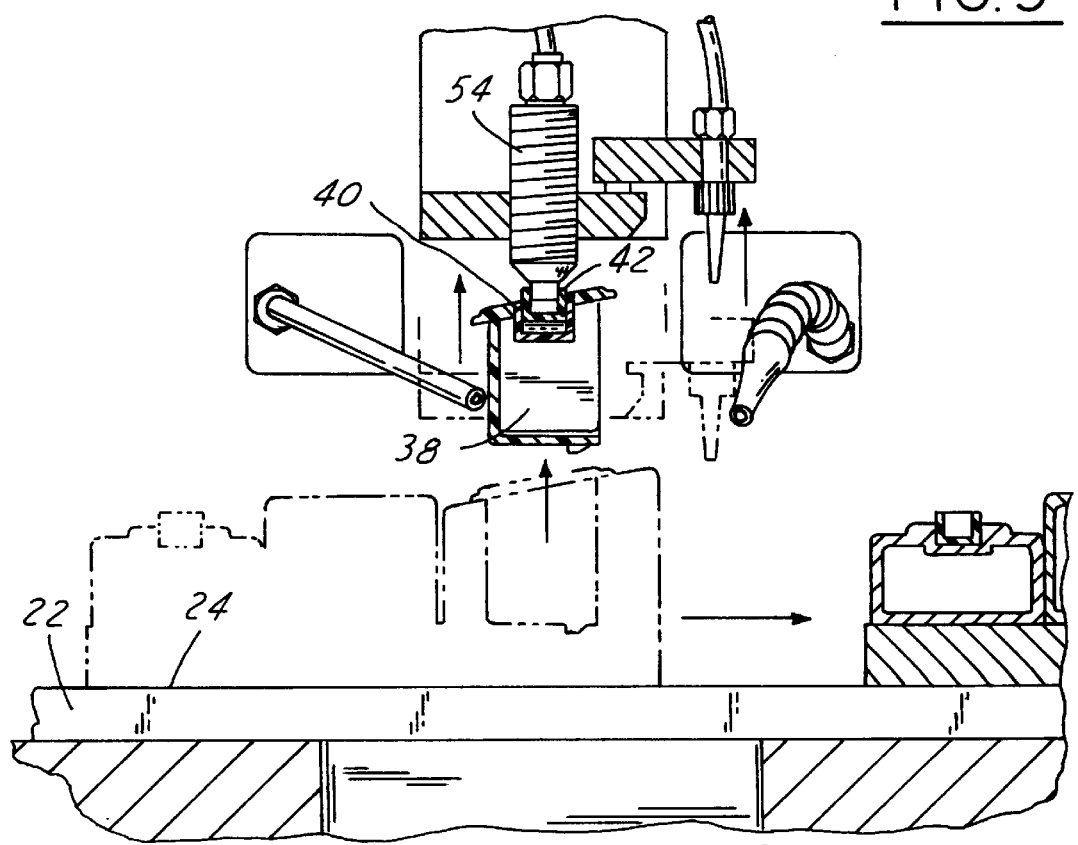
FIG. 10 is a partial side view of the apparatus at the third detent with the upper platen raised.

As depicted in FIGS. 9 and 16, limit valve LV5 is then actuated, and cylinder 84 retracts to move slider 28 into the third detent. Timer TD4 then is initiated. When slider 28 moves to the third detent, limit valve LV6 is actuated. Timer TD5 then is initiated and timer TD4 stops. As timer TD4 stops, ram 54 begins to extend to release limit valve LV5. When ram 54 is fully extended, limit valve LV3 is actuated and the PAR assembly is inserted into bracket 38, as shown in FIG. 9.

Then, limit valve LV3 is actuated and timer TD2 is initiated. As shown in FIG. 15, relay valve RV11A is shifted to disable the ram from extending. Timer TD2 then stops and ram 54 retracts with the assembly. Limit valve LV3 is then released.

As illustrated in FIG. 16, Rams 54, 54' then fully retract to actuate limit valve LV5 and timer TD4 is initiated. Timer TD5 then stops. Then, cylinder 82 extends slider 28 to its initial position releasing limit valves LV6 and LV4. Part present sensor VAC2 on ram is then disabled. Slider 28 then extends to its initial position, actuating limit valve LV1 in FIG. 13. A counter (not shown) counts one part to equal a total of two parts counted. Cylinders 82 and 84 of FIG. 1 are extended, and the fastener assemblies are blown off ram 54 ram into a container (not shown) as depicted in FIG. 11.

As stated above, the air flow mechanism is configured such that if an assembled part remains present on rams 54, 54' in the initial position, then rams 54, 54' will be disabled and an indicator shown in FIG. 15 will be red. Moreover, if parts are not present in sockets 53, 53' in the first detent position, then rams 54, 54' will be disabled and the indicator will be red. Additionally, if pistons 42 are not present in rams 54, 54' in the second detent position, then rams 54, 54' will not extend and the indicator will be red. Furthermore, to reset rams 54, 54', all parts are manually put into their respective initial places. Once properly completed, the indicator will be green. Buttons PB1 and PB2 are pressed in order to continue the cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of verifying an encapsulation of quick-setting adhesive in small hermetically sealed reservoirs from which the adhesive is dispensed upon depression of a reservoir piston sealing the mouth of the reservoirs, the method comprising:

feeding a group of small reservoir cups to a filling station;
   determining an alignment of the group of small reservoir cups within the filling station;
   flooding the interior of each cup at the station with cure preventing gas in sufficient quantity to displace the ambient atmosphere therefrom, if the group of small reservoir cups is determined to be aligned;
   depositing a predetermined amount of the quick-setting adhesive into each of the reservoir cups; and
   while flooding the same with the gas, inserting a piston into each of the reservoir cups on top of the adhesive.

2. The method of claim 1 further comprising:
   interrupting the encapsulation, if the group of small reservoir cups are determined to be not aligned within the filling station and signaling that a reservoir cup of the group in the filling station is not aligned.

3. The method of claim 1 further comprising:
   sensing the failure to deposit the quick-setting adhesive into the reservoir cups; and
   interrupting the encapsulation.

4. The method of claim 1 further comprising:
   determining whether each piston is present in each reservoir cup respectively of the group of reservoir cups;
   interrupting the encapsulation, if each piston is not present;
   determining whether each piston is respectively aligned with each of the group of reservoir cups; and
   interrupting the encapsulation, if each piston is not aligned respectively with each cup.

5. The method of claim 1 further comprising:
   inserting each reservoir cup into a part which is to be adhesively attached to a component upon depression of the piston into the reservoir cup;
   sensing the presence of each reservoir cup in respectively each part; and
   interrupting the encapsulation method, if each reservoir cup is not respectively present in each part.

6. The method of claim 1 further comprising:
   sensing the failure to deposit the quick-setting adhesive into the reservoir cups; and
   interrupting the encapsulation.

7. The method of claim 1 further comprising:
   determining whether each piston is present in each reservoir cup respectively of the group of reservoir cups;
   interrupting the encapsulation, if each piston is not present;
   determining whether each piston is respectively aligned with each of the group of reservoir cups; and
   interrupting the encapsulation, if each piston is not aligned respectively with each cup.

8. The method of claim 1 further comprising:
   inserting each reservoir cup into a part which is to be adhesively attached to a component upon depression of the piston into the reservoir cup;
   sensing the presence of each reservoir cup in respectively each part; and
   interrupting the encapsulation method, if each reservoir cup is not respectively present in each part.

9. A method of verifying an encapsulation of quick-setting adhesive in small reservoir cups from which the adhesive is dispensed, the method comprising:
   feeding a group of the small reservoir cups to a filling station free of an adhesive curing agent;
   determining an alignment of the group of small reservoir cups within the filling station;
   depositing a predetermined amount of the adhesive in the successive reservoir cups in said station, if the group of small reservoir cups is determined to be aligned;

flooding the free surface of the adhesive with an inert gas to displace an adhesive curing gas or vapor therefrom;

inserting a piston into the reservoir cup on top of the adhesive.

10. The method of claim 9 further comprising:

interrupting the encapsulation, if the group of small reservoir cups are determined not to be aligned within the filling station; and signaling that a reservoir cup of the group in the filling station is not aligned.

11. A method of verifying an encapsulation of quick-setting adhesive responsive to atmospheric moisture in small reservoir cups from which the adhesive is to be dispensed, the method comprising:

presenting each reservoir cup in a filling station in a position to receive the adhesive;

determining an alignment of each reservoir cup within the filling station;

displacing moisture from the interior of each reservoir cup in the station, if each reservoir cup is determined to be aligned;

while the reservoir cups are free of moisture, depositing a predetermined amount of the adhesive into each of the reservoir cups; and while displacing moisture from the interior of the reservoir cups, inserting a piston into each reservoir cup above the free surface, whereby the adhesive is sealed from atmospheric moisture.

* * * * *